US007241352B2

(12) United States Patent
Crandell

(10) Patent No.: US 7,241,352 B2
(45) Date of Patent: Jul. 10, 2007

(54) INSULATING UNITLESS WINDOW SASH

(75) Inventor: Stephen L. Crandell, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 120 days.

(21) Appl. No.: 10/926,902

(22) Filed: Aug. 26, 2004

(65) Prior Publication Data

US 2005/0022462 A1 Feb. 3, 2005

Related U.S. Application Data

(62) Division of application No. 09/121,370, filed on Jul. 23, 1998, now Pat. No. 6,886,297.

(51) Int. Cl.
*C03C 27/00* (2006.01)
*E06B 3/24* (2006.01)

(52) U.S. Cl. .................................... 156/109; 29/897.32

(58) Field of Classification Search ............... 52/204.6, 52/204.7, 204.705, 786.1, 786.11, 786.13, 52/656.5, 656.6, 656.7; 156/107, 109; 29/897.32; 428/34

See application file for complete search history.

(56) References Cited

U.S. PATENT DOCUMENTS 2,029,541 A * 2/1936 Martinson .............. 52/204.593
2,052,244 A * 8/1936 Pertz ........................ 52/786.13
2,205,522 A * 6/1940 Fix ........................... 52/786.1
2,885,746 A 5/1959 Gura
3,919,023 A 11/1975 Bowser et al.
4,015,394 A 4/1977 Kessler
4,027,443 A 6/1977 Briggs
4,109,432 A 8/1978 Pilz
4,170,460 A 10/1979 Donley
4,237,597 A * 12/1980 Auger ..................... 29/897.32
4,239,816 A 12/1980 Breininger et al.
4,259,135 A 3/1981 Kulla
4,462,884 A 7/1984 Gillery et al.
4,485,603 A 12/1984 Derner et al.
4,610,711 A 9/1986 Matesa et al.
4,692,389 A 9/1987 Gillery et al.
4,719,127 A 1/1988 Greenberg
4,719,728 A * 1/1988 Eriksson et al. .............. 52/172

(Continued)

FOREIGN PATENT DOCUMENTS

CH 383601 1/1965

(Continued)

*Primary Examiner*—Michael Safavi
(74) *Attorney, Agent, or Firm*—Andrew C. Siminerio

(57) ABSTRACT

An insulating unitless window sash includes a sash frame made of four linear sash members having their mitered edges joined together. Each of the sash members in cross section includes a peripheral surface, a first and outer side walls and a first groove spaced from a second groove. Each of the grooves has a base and spaced walls. The base of the first groove is spaced a greater distance from the peripheral surface than the base of the second groove. Peripheral and marginal edges of a first sheet are in the first groove and peripheral and marginal edges of a second sheet are in the second groove. A shim is mounted on the sash frame adjacent the outer surface of the first sheet to give a balance configuration.

A method of fabricating the insulating unitless sash is also disclosed.

19 Claims, 5 Drawing Sheets

U.S. PATENT DOCUMENTS

| | | | | |
|---|---|---|---|---|
| 4,792,536 | A | 12/1988 | Pecoraro et al. | |
| 4,806,220 | A | 2/1989 | Finley | |
| 4,853,256 | A | 8/1989 | Obringer et al. | |
| 4,873,206 | A | 10/1989 | Jones | |
| 4,898,789 | A | 2/1990 | Finley | |
| 4,952,430 | A | 8/1990 | Bowser et al. | |
| 5,030,593 | A | 7/1991 | Heithoff | |
| 5,106,663 | A | 4/1992 | Box | |
| 5,131,194 | A | 7/1992 | Anderson | |
| 5,240,886 | A | 8/1993 | Gulotta et al. | |
| 5,466,534 | A | 11/1995 | Newby | |
| 5,492,947 | A | 2/1996 | Wood et al. | |
| 5,512,341 | A | 4/1996 | Newby et al. | |
| 5,531,047 | A | 7/1996 | Leopold et al. | |
| 5,617,699 | A | 4/1997 | Thompson, Jr. | |
| 5,636,484 | A | 6/1997 | DeBlock | |
| 5,655,282 | A | 8/1997 | Hodek et al. | |
| 5,675,944 | A | 10/1997 | Kerr et al. | |
| 5,720,836 | A | 2/1998 | Gallagher et al. | |
| 5,921,037 | A * | 7/1999 | Minter | 52/204.7 |
| 6,055,783 | A * | 5/2000 | Guhl et al. | 52/786.1 |
| 6,868,648 | B2 * | 3/2005 | Glover et al. | 52/786.1 |
| 2004/0231255 | A1 * | 11/2004 | Silverman | 52/204.6 |

FOREIGN PATENT DOCUMENTS

| | | | |
|---|---|---|---|
| DE | 951 040 | | 10/1956 |
| DE | 965 661 | * | 6/1957 |
| DE | 30 49 356 | | 10/1982 |
| FR | 2301678 | | 9/1976 |
| SU | 964094 | | 10/1982 |
| WO | 98/25001 | | 6/1998 |
| WO | 99/14169 | | 3/1999 |

* cited by examiner

1/5

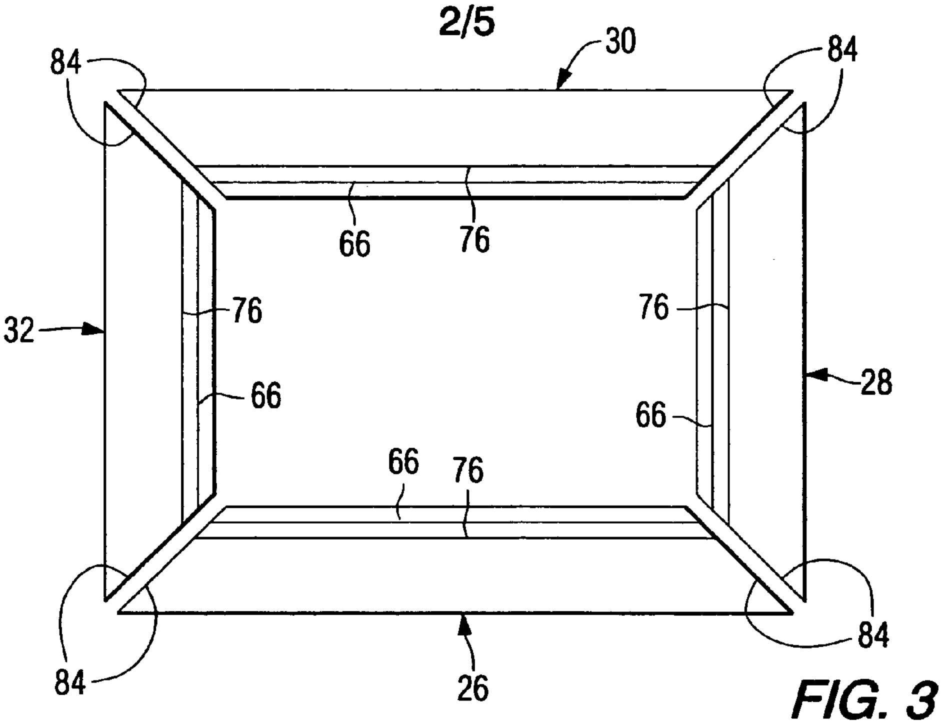
FIG. 3
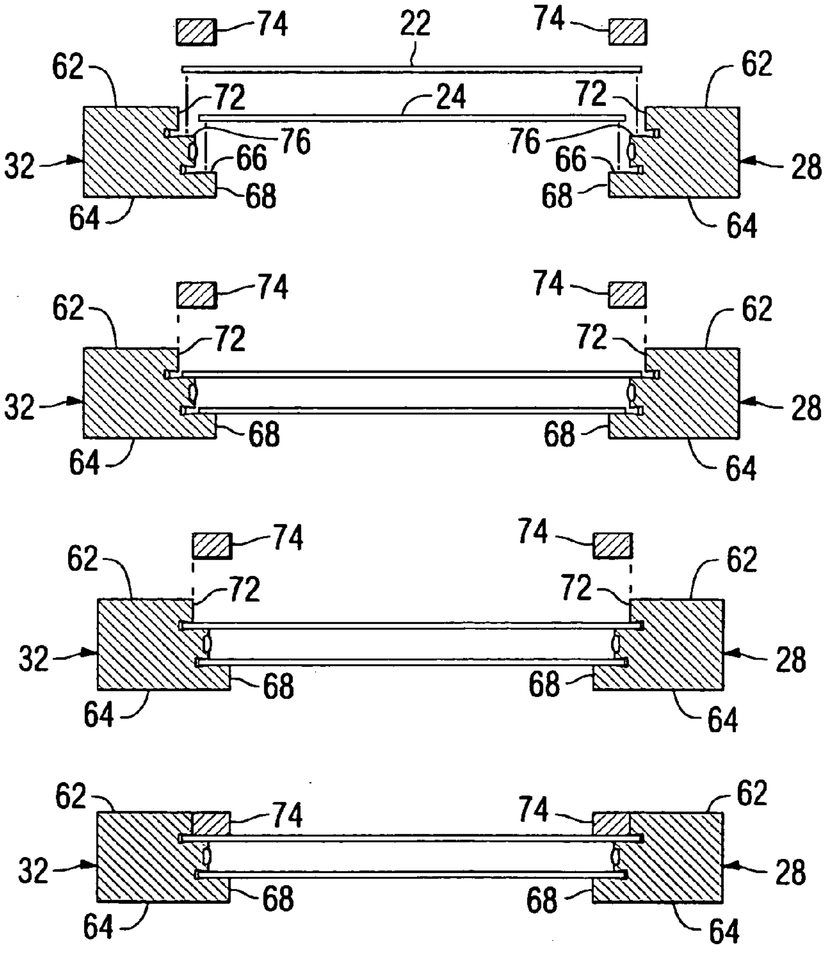
FIG. 4A
FIG. 4B
FIG. 4C
FIG. 4D

INSULATING UNITLESS WINDOW SASH

CROSS REFERENCE TO RELATED APPLICATIONS

This application is a divisional application of U.S. patent application Ser. No. 09/121,370 filed on Jul. 23, 1998, now U.S. Pat. No. 6,886,297 and entitled "Insulating Unitless Window Sash", the disclosure of which is hereby incorporated by reference.

FIELD OF THE INVENTION

This invention relates to an insulating unitless window sash, and in particular, to a sash for maintaining two or more glass sheets spaced from one another with optionally a dead gas space between adjacent sheets, and to a method of making the unitless window sash.

BACKGROUND OF THE INVENTION

The present usual practice of fabricating an insulating window sash includes fabricating an insulating glazing unit and mounting sash members around the perimeter and marginal edges of the unit. The insulating unit may be made in any manner, for example, but not limited to the techniques disclosed in U.S. Pat. Nos. 5,655,282; 5,675,944; 5,531,047; 5,617,699 and 5,720,836. The insulating units provide a dead gas space between adjacent sheets.

Although the present usual practice is acceptable, there are limitations. For example, one limitation is making the insulating glazing unit, and thereafter, mounting the sash members around the perimeter of the unit.

As can be appreciated by those skilled in the art of fabricating insulating window sashes, eliminating the manufacturing steps to make an insulating unit significantly reduces the cost of manufacturing the window. Further, it would be advantageous to provide a window sash that has the benefits of an insulating glazing unit without the limitations of mounting sash members around the perimeter of the insulating unit.

SUMMARY OF THE INVENTION

This invention relates to an insulating unitless window sash having a frame made of sash members or sections defined as a sash frame. Preferably, adjacent ends of the sash members are joined together to provide a closed sash frame; however, as will be appreciated, one or more of the adjacent ends of the sash members may be spaced from one another to provide an open sash frame. Two sheets, e.g. transparent sheets such as glass sheets are spaced from one another within the sash frame. The sash frame is preferably made of at least two sash members, e.g. for a sash having a parallelepiped shape, the sash members may have two "L" shaped sash members or four linear sash members. The sash members preferably have mitered ends and in cross section each have a peripheral surface and opposed outer surfaces connected to the peripheral surface, and a first groove spaced from a second groove. Each of the grooves has a base and walls, are preferably of equal depth and extend along the length of the sash member. The distance between the walls of each of the grooves preferably increases as the distance from the base of the groove decreases to provide inwardly sloped walls. The base of the first groove is preferably farther from the peripheral surface of the sash section than the base of the second groove. The outer surface of the sash section adjacent the first groove extends farther from the peripheral surface than the outer surface of the sash section adjacent the second groove to provide a ledge adjacent the first groove. The peripheral and marginal edges of a first glass sheet are mounted in the first groove, and the peripheral and marginal edges of a second sheet are mounted in the second groove. Preferably a moisture impervious sealant is in each of the grooves to prevent the ingress of the surrounding atmosphere. Preferably a channel is provided between the first and second grooves on the surface of the sash member opposite the peripheral surface. A bead of a moisture pervious adhesive having a desiccant or a porous tube having desiccant is provided in the channel to absorb moisture between the glass sheets. A facing member is mounted on the outer surface of each of the sash members adjacent the second groove for a balanced appearance of the unitless window sash.

The invention is also directed to a method of making the unitless window sash. At least two sash sections e.g. for a parallelepiped shaped window, preferably four sash sections having mitered ends and having the cross sectional configuration discussed above. A layer of a moisture impervious sealant is provided in each of the grooves, and a bead of moisture pervious adhesive having a desiccant is provided in the channel between the grooves. The sash members are positioned with the mitered ends slightly spaced from one another. A first sheet having a length and width less than the length and width of a second sheet is positioned on the ledge adjacent the first groove and the second sheet is positioned on a ledge adjacent the second groove. Thereafter the sash sections are moved toward one another to move the is peripheral and marginal edges of the first sheet into the first groove and the peripheral and marginal edges of the second sheet into the second groove. The mitered ends of the sash members are preferably sealed with a moisture impervious material or sash member made of vinyl may have their adjacent ends welded to prevent surrounding atmosphere from moving into the compartment between the sheets.

As will be appreciated, the insulating unitless window sash of the instant invention has improved thermal performance compared with a window sash having preassembled units.

BRIEF DESCRIPTION OF THE DRAWINGS

FIG. 3 is a plan view of an arrangement of sash members during fabrication of the sash incorporating features of the invention.

FIGS. 4A through 4D are side elevated views having portions removed for purposes of clarity showing selected steps of the method of the invention to fabricate the sash incorporating features of the invention.

DESCRIPTION OF THE INVENTION

Figure 1:
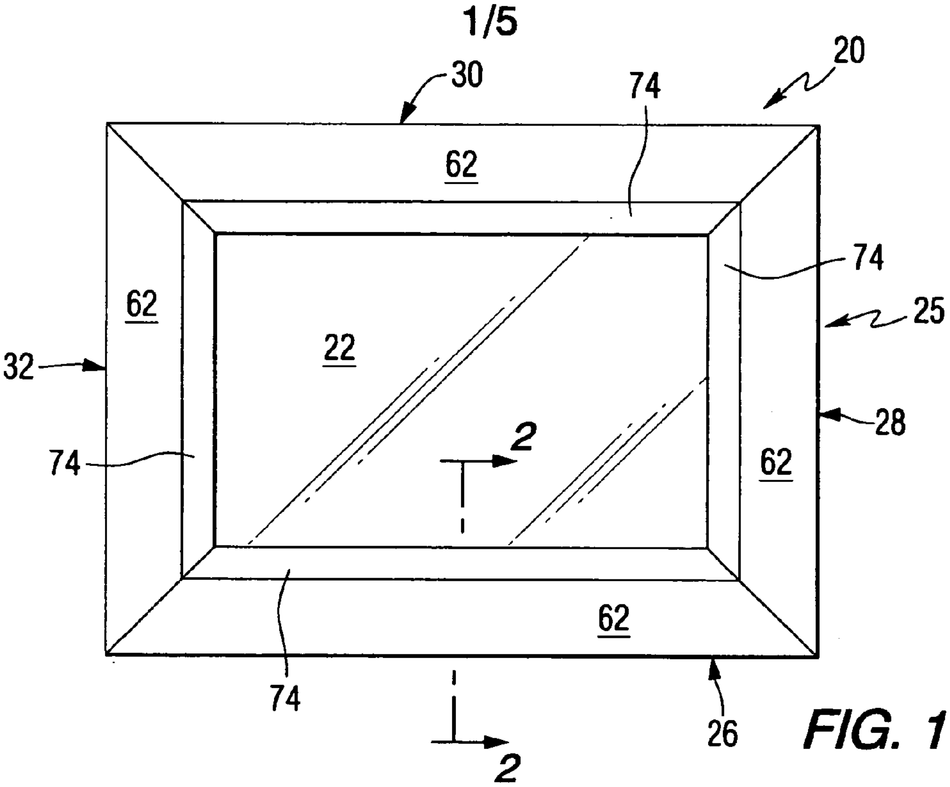
FIG. 1 is a front elevated view of a unitless window sash unit incorporating features of the invention.
Figure 2:
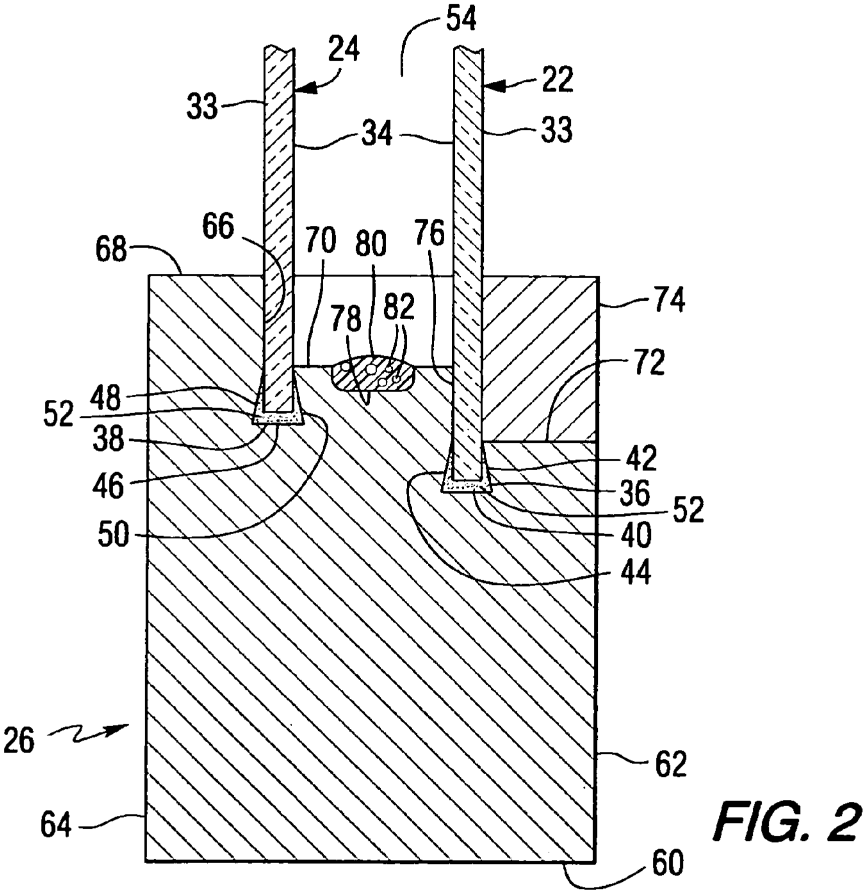
FIG. 2 is a view taken along lines 2-2 of FIG. 1.

With reference to FIGS. 1 and 2, there is shown an insulating unitless window sash 20 incorporating features of the invention. The window sash 20 includes a pair of sheets 22 and 24 held in spaced relation by sash frame 25 preferably a closed sash frame made up of sash members or sections 26, 28, 30 and 32.

In the following discussion, the sheets 22 and 24 are glass sheets; however, as will become apparent, the sheets may be made of any material, e.g. glass, plastic, metal and/or wood, and the selection of the material of the sheets is not limiting to the invention. Further, the sheets may be made of the same material or the sheets may be made of different materials. Still further, one sheet may be a monolithic sheet, and the other sheet(s) may be laminated sheet(s), e.g. made of one or more monolithic sheets laminated together in any usual manner.

In the practice of the invention, one or more of the glass sheets may be uncoated and/or coated colored sheets. Not limiting to the invention, colored sheets of the type disclosed in U.S. Pat. Nos. 4,873,206; 4,792,536; 5,030,593 and 5,240,886, which disclosures are hereby incorporated by reference, may be used in the practice of the invention. Not limiting to the invention, one or more of the surfaces of one or of the more sheets may have an environmental coating to selectively pass predetermined wavelength ranges of light and energy, e.g. glass or plastic transparent sheets may have an opaque coating of the type used in making spandrels or coatings of the type disclosed in U.S. Pat. Nos. 4,170,460; 4,239,816; 4,462,884; 4,610,711; 4,692,389; 4,719,127; 4,806,220; 4,853,256 and 4,898,789, which disclosures are hereby incorporated by reference. Still further, in the practice of the invention but not limiting thereto, the surfaces of the sheets may have a photocatalytic cleaning film or water reducing film, e.g. of the type disclosed in U.S. patent application Ser. No. 08/927,130 filed on Aug. 28, 1997, in the name of James P. Thiel for PHOTOELECTRICALLY-DESICCATING MULTIPLE-GLAZED WINDOW UNITS; U.S. patent application Ser. No. 08/899,257 filed on Jul. 23, 1997, in the names of Charles B. Greenberg et al. for PHOTOCATALYTICALLY-ACTIVATED SELF-CLEANING ARTICLE AND METHOD OF MAKING SAME, and U.S. patent application Ser. No. 60/040,566 filed on Mar. 14, 1997, in the names of Charles B. Greenberg et al. for PHOTOCATALYTICALLY-ACTIVATED SELF-CLEANING GLASS FLOAT RIBBON AND METHOD OF PRODUCING SAME, which disclosures are hereby incorporated by reference. The photocatalytic film disclosed in U.S. patent application Ser. Nos. 08/899,257 and 60/040,566 is preferably deposited on the outer surface 33 of one or both sheets 22 and 24; however, the invention contemplates depositing the photocatalytic film on the inner surface 34 of one or both sheets 22 and 24, and on the surface of the sash members. The water reducing film disclosed in U.S. patent application Ser. No. 08/927,130 is preferably deposited on the inner surface 34 of one or more of the sheets 22 and 24; however, the invention contemplates depositing the coating on the outer surface 33 of one or both of the sheets 22 and 24, and on the surface of the sash members.

In the following discussion, the sash frame 25 is shown in FIG. 1 as a closed sash frame; however, the discussion will refer to a sash frame to indicate that the sash frame unless indicated otherwise may be an open sash frame or a closed sash frame. The peripheral shape of the sash frame 25 is not limiting to the invention; however, for ease of discussion the peripheral shape of the sash frame 25 is considered to have a parallelepiped shape, e.g. a rectangular shape as shown in FIG. 1; however, as will become apparent from the following discussion, the invention is not limited thereto and the sash frame may have any peripheral shape, e.g. trapezoidal, circular, elliptical, a combination of linear and circular portions, a combination of linear and elliptical portions or any combinations thereof.

The following discussion relating to sash member 26 is applicable to sash members 28, 30 and 32 unless indicated otherwise.

With reference to FIG. 2, each of the sash members (sash member 26 only shown in FIG. 2) includes a pair of spaced grooves, e.g. a first groove 36 and a second groove 38 for receiving marginal and peripheral edge portions of the sheets 22 and 24 respectively in a manner to be discussed below. The groove 36 includes a base 40 and walls 42 and 44; the groove 38 includes a base 46 and walls 48 and 50. Although not limiting to the invention, the distance between the walls 42 and 44, and the distance between the walls 48 and 50 increases as the distance to their respective bases 40 and 46 decreases to provide the grooves 36 and 38 with inwardly sloping walls. As can be appreciated, the length of the walls of the grooves may be equally spaced from one another or the walls may be outwardly sloped. Mounted in each of the grooves 36 and 38 is a moisture impervious adhesive-sealant 52 of the type used in the art of making insulating glazing units to prevent moisture from the environment or atmosphere from moving into the compartment 54 between the sheets.

Although not limiting to the invention, the material for the adhesive-sealant 52 preferably has a moisture permeability of less than about 20 grams millimeter (hereinafter "gm mm")/square meter (hereinafter "$M^2$") day, and more preferably less than about 5 gm mm/$M^2$ day, determined using the procedure of ASTM F 372-73. The adhesive-sealant 52 may be any of the types used in the art for sealing the space between sheets of an insulating unit. Adhesive-sealants that may be used in the practice of the invention include, but are not limited to, butyls, silicones, polyurethane adhesives, and butyl hot melts of the type sold by H. B. Fuller, e.g. H. B. Fuller 5140. Further, the adhesive-sealant is selected depending on the insulating gas in the space between the sheets, e.g. argon, air, krypton, etc. to maintain the insulating gas in compartment 54.

With continued reference to FIG. 2 the sash member 26 includes a peripheral surface 60 and outer surfaces 62 and 64. The outer surface 62 has a height as measured from the peripheral surface 60 less than the height of the outer surface 64 as measured from the peripheral surface 60. A reason of the height difference between the surfaces 62 and 64 is discussed below. The wall 48 of the second groove 38 has an extension or ledge 66 that terminates at outer second platform 68 as does the outer surface 64. The platform 68 is opposite to the peripheral surface 60 of the sash member 26. The wall 50 of the second groove 38 terminates at inner platform 70. The wall 42 of the first groove 36 terminates at outer first platform 72 as does the outer surface 62. The outer second platform 70 is spaced a greater distance from the peripheral surface 60 of the sash member 26 than the outer first platform 72. A shim 74 is mounted and preferably secured to the platform 72 to provide the sash member 26 with a balanced cross sectional configuration and the unitless window sash with a balanced configuration. The wall portion 44 of the first groove 36 has an extension or ledge 76 that terminates at the inner platform 70. The ledges 66 and 76 support the sheets during fabrication in a manner discussed below.

As can be appreciated, the dimensions of the surfaces of the sash member 26 as viewed in cross section and the length of the sash member 26 are not limiting to the invention, and a general relationship is discussed for an appreciation of the invention. As viewed in FIG. 2, the height of the extension 66 is preferably about 0.5 inch (1.27 centimeters ("cm")). The distance between the walls of the grooves 36 and 38 farthest from the base 40 and 46 of the grooves 36 and 38 respectively is slightly larger e.g. about 0.063 inch (0.159 cm) than the thickness of the sheet to be moved into the groove. The wall portions of the grooves are sloped inwardly to flow the adhesive-sealant positioned in the grooves around the peripheral and marginal edge portions of the sheets as they move into their respective groove in a manner discussed below. The depth of the grooves is not limiting to the invention; however, the grooves should have sufficient depth to provide a seal around the peripheral and marginal edges of the sheets and capture the sheets in their respective groove. Grooves having a depth in the range of about 0.188 inch (0.48 cm) to about 0.375 inch (0.95 cm) are acceptable. The distance between the glass sheets is not limiting to the invention; however, it is preferred that the distance be sufficient to provide an insulating gas space between the sheets while minimizing if not eliminating gas currents from forming in the compartment 54. As is appreciated by those skilled in the art, the distance between the sheets is dependent on the gas in the compartment. For example, a distance in the range of about 0.25 inch (0.63 cm) to about 0.625 inch (1.58 cm) is preferred for air.

A channel 78 is preferably formed in the surface of the inner platform 70 to receive a desiccating medium. As can be appreciated, the invention is not limited to the type of desiccating medium used in the practice of the invention. For example, the desiccating medium may be as shown in FIG. 2 a bead 80 of a moisture pervious adhesive having a desiccant 82 to absorb moisture in the compartment 54. The moisture pervious adhesive may be any of the types known in the art for carrying a desiccant e.g. of the types disclosed in U.S. Pat. Nos. 5,177,916; 5,531,047 and 5,655,280.

The discussion will now be directed to one embodiment of fabricating an insulating unitless window sash incorporating features of the invention. With reference to FIGS. 2, 3 and 4, as required, the sash sections 26, 28, 30 and 32 having mitered ends and the general cross section shown in FIG. 2 are provided with a layer of a moisture impervious adhesive-sealant 52 (shown in FIG. 2) in the grooves 36 and 38, and a bead 80 of moisture-pervious adhesive having a desiccant 82 in the channel 78 (shown in FIG. 2). The depth of each of the first and second grooves is about ¼ inch (0.64 cm) and the extensions 66 and 76 each have a height about ½ inch (1.27 cm). The distance between the walls of the grooves 36 and 38 at the opening of the grooves is about 0.160 inch (0.381 cm). The sash members 26 and 28 have a length as measured along the perimeter surface of about 3⅓ feet (101.6 cm) and the sash members 28 and 32 have a length as measured along the perimeter surface of about 2⅓ feet (71.12 cm). As viewed in FIG. 2, the height of the outer marginal surface 62 is about 1⅛ inches (2.86 cm), and the height of the outer marginal surface 64 is about 2 inches (5.08 cm). The thickness of the peripheral surface as measured between the outer marginal surfaces 62 and 64 is about 1½ inches (3.81 cm).

With reference to FIG. 3, the four sash sections 26, 28, 30 and 32 are positioned with the mitered end 84 of one sash section spaced about ¼-½ inch (0.64-1.28 cm) from the mitered end of the adjacent sash member.

Referring now to FIG. 4, in particular FIGS. 4A and 4B, a piece of glass having a length of about 2 feet (60.96 cm) and a width of about 3 feet (91.44 cm) is positioned on the extension or ledge 66 of the sash members and a piece of glass having a length of about 2 feet 1 inch (65 cm) and a width of about 3 feet 1 inch (94 cm) and is positioned on the extension or ledge 76 of each of the sash members 26, 28, 30 and 32 (only sash members or sections 28 and 32 shown in FIGS. 4A thru 4D). Each of the glass sheets has a thickness of about 0.1 inch (0.25 cm). The sash members 26, 28, 30 and 32 are moved toward one another to move the peripheral and marginal edges of the sheets 22 and 24 into the grooves 36 and 38 respectively of the sash members into contact with the moisture impervious material in the grooves as shown in FIG. 4C. The mitered ends of adjacent sash members are moved into contact with one another capturing the glass sheets in their respective grooves and the moisture impervious material moves around the marginal edges of the sheet to fill the groove. The shim 74 as viewed in FIG. 2 having a width of about 0.5 inch (1.27 cm) and a height of about ⅞ inch (2.22 cm) is secured to the platform 72 as shown in FIG. 4D to balance the appearance of the window sash 20. The ends of the sash members are held together in any usual manner, e.g. by nails, screws, adhesive, etc.

Figure 5A:
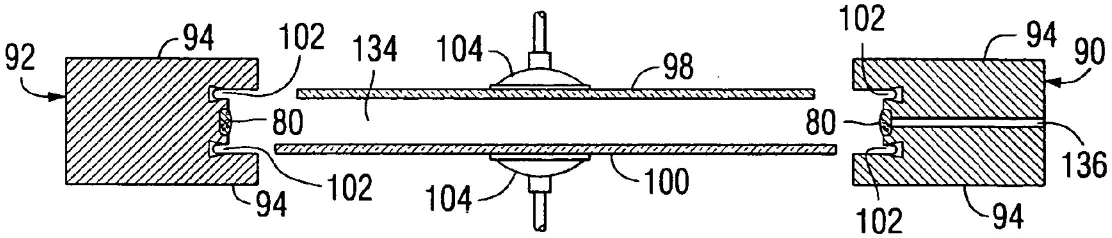
FIGS. 5A and 5B are side elevated views having portions removed for purposes of clarity showing selected steps of an alternate embodiment of the method of the invention.
Figure 5B:
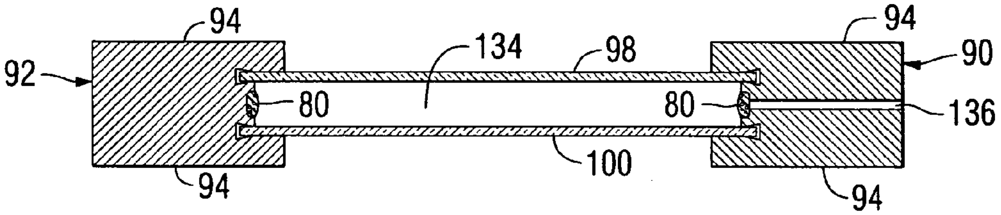

As can now be appreciated, the extensions 66 and 76 provide a horizontal support for the marginal edges of the sheets 24 and 22 respectively as the sash members are moved toward one another; however, the invention is not limited thereto. More particularly and with reference to FIGS. 5A and 5B, there are shown side views of sash members 90 and 92 similar to the view of sash members 28 and 32 in FIGS. 4A and 4D. The outer surfaces 94 of the sash members 90 and 92 are the same dimension as measured from the peripheral surface 96 of the sash member. Glass sheets 98 and 100 of similar dimensions are held in spaced relationship to one another and aligned with grooves 102 in the sash members 90 and 92 in any convenient manner e.g. by suction cups 104 (shown in FIG. 5A).

Moving the sash members 90 and 92 and the other opposed sash members (not shown) toward one another moves the peripheral and marginal edges of the sheets into their respective grooves 102 of the sash members. The bead 80 of adhesive having the desiccant 82 is shown in FIG. 5 below the outer surfaces 94 of the sash member to be out of the sight line; however, as can be appreciated, the bead 80 and the surface supporting the bead may be in any position relative to the outer surfaces 94. For example, the bead 80 and platform supporting the bead may be above or level with the outer surfaces 94.

In the preceding discussion and in the Figures the fabrication is shown with the glass sheets in the horizontal position; however, as can now be appreciated the glass sheets and sash members may be in a vertical, horizontal and/or slanted position. Further, all the sash members may be moved toward one another during fabrication or one of the pair of opposed sash members may be stationary and the other moveable toward its respective stationary sash member.

Figure 6A:
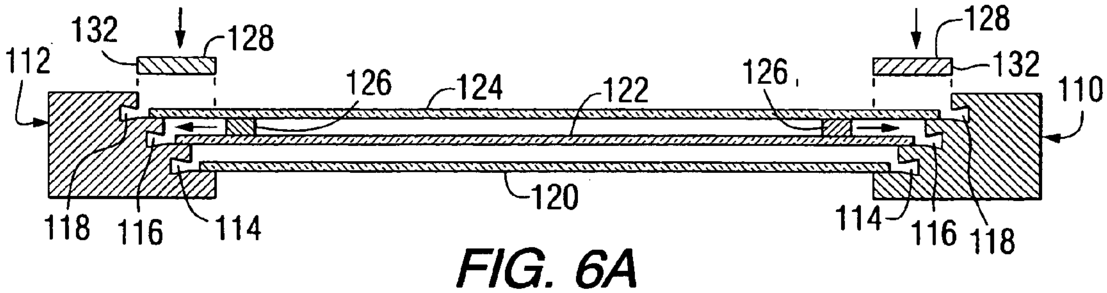
FIGS. 6A and 6B are side elevated views having portions removed for purposes of clarity showing selected steps of the method of the invention to fabricate a unitless window sash of the invention having three spaced sheets.
Figure 6B:
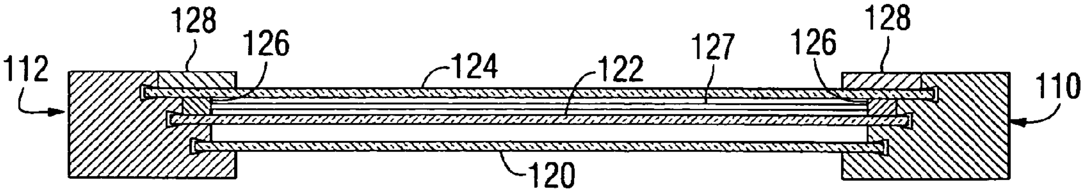

As can now be appreciated, the invention is not limited to the number of sheets of the insulating unitless window sash of the invention. For example and with reference to FIG. 6, sash members 110 and 112 each have three grooves 114, 116 and 118 for receiving peripheral and marginal edges of sheets 120, 122 and 124. For a balanced appearance a shim frame 126 is mounted on the middle sheet 122. The shim frame 122 may have muntin bars (not shown). The sash members are brought together to move the peripheral and marginal edges of the sheets 120, 122 and 124 into their respective groove 114, 116 and 118. Thereafter the shims 128 are mounted to the outside ledges 132 to give a balanced appearance. A bead 80 of the moisture pervious material having the desiccant may be provided between the sheets 120 and 122 as previously discussed for providing the bead 80 between the sheets 22 and 24 shown in FIG. 2, and a bead 80 may be provided on the inner surface of the shim frame 126. As can be appreciated, the sheet 122 may be a glass sheet to increase the insulating value of the unitless window sash or may be a decorative panel such as those used in art glass applications.

In the fabrication of insulating units it is preferred to have dry gas in the compartment between adjacent sheets e.g. air, krypton, argon or any other type of thermally insulating gas. When air is the insulating gas, the unit may be fabricated in the atmosphere to capture the atmosphere in the compartment between the sheets as the sash members are brought together. In the instance where an insulating gas is of a particular purity or other than atmospheric air is preferred in the compartment, the unitless window sash of the invention is fabricated in the desired atmosphere or fabricated and thereafter a hole may be provided in one of the sash members. The hole may extent from the peripheral surface into compartment 134 between the sheets as shown for hole 136 shown only in FIG. 5 and gas moved into the compartment in any usual manner e.g. as disclosed in U.S. Pat. No. 5,531,047 which disclosure is hereby incorporated by reference. After the compartment 134 is filled, the hole 136 is hermetically sealed. As can be appreciated, the compartment between the sheets may be open to the environment by having holes moving air into and out of the compartment e.g. as disclosed in U.S. Pat. No. 4,952,430. When air is continuously moved into and out of the compartment, the coating on the inner surface of the glass sheets should be capable to be in continuous contact with the atmosphere without deterioration. Further, the coating disclosed in U.S. patent application Ser. Nos. 08/899,257 and/or 60/040,566 discussed above may be used on the inner surface of the glass sheets. Still further the compartment between the sheets may be connected to the environment by way of a tube filled with a desiccant e.g. as is known in the art. In this manner, air moves into and out of the compartment through the desiccant.

Figure 7:
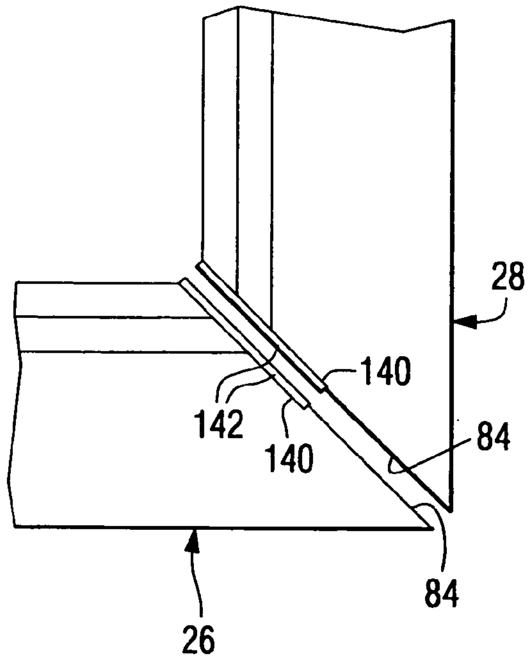
FIG. 7 is a partial plan view illustrating a technique for sealing corners of a closed sash frame.
Figure 8:
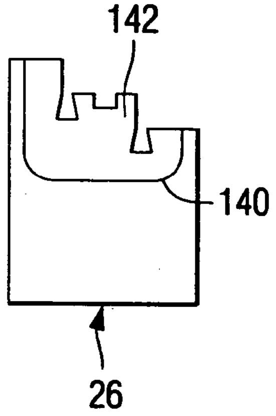
FIG. 8 is an exposed view illustrating the technique for sealing corners of a closed sash frame shown in FIG. 7.

Those skilled in the art of fabricating insulating units appreciate that the gas in the compartment between the glass sheets is preferably dry and the movement of ambient air into and out of the compartment is preferably prevented because excessive moisture may result in saturation of the desiccant and moisture condensing on the inner surface of the sheets. Considering the above, it is recommended that the mitered ends be sealed in any convenient manner. With reference to FIG. 7 and 8, one technique to seal the ends of the sash members is to mill a recess 140 in each end 84 of the sash members (only one end of each sash members 26 and 28 are shown in FIG. 7) and to provide a moisture impervious layer 142 in the recess, e.g. a polyisobutylene type or any of the adhesive-sealants discussed above. As the ends of the mitered sash members are brought together, the moisture impervious layer 142 are urged together to form a moisture impervious seal around the peripheral and marginal edges of the sheets.

Figure 9:
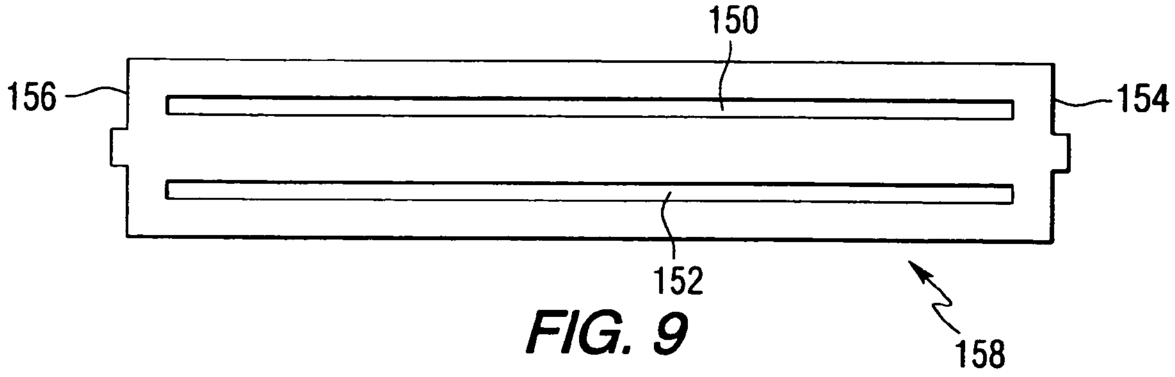
FIG. 9 is a plan view of a sash member incorporating features of the invention used in the fabrication of a sash frame having sash members having non-mitered ends.

The invention is not limited to the configuration of the ends of the sash members. For example, the ends may be flat, e.g. unmitered instead of mitered. In the instance where the ends are unmitered, a pair of sash members have the grooves extending along their length, e.g. the grooves 36 and 38 for sash member 26 shown in FIG. 2. The other pair of sash members (one only shown in FIG. 9) have the grooves 150 and 152 terminating short of the ends 154 and 156 as shown for sash member 158 in FIG. 9. Further the ends for any of the sash members may have a tongue and groove arrangement (tongue portion only shown in FIG. 9) for interlocking adjacent sash members together.

The insulating unitless window sash incorporating features of the invention provides an economical window sash having improved thermal performance. The window sash is economical to make because it eliminates the need to make an insulating unit. The window sash has improved performance because the total window heat gain and loss is through the frame and not the IG edge area. Further, computer simulations of window sashes made of wood and incorporating features of the invention discussed above show that the U value (measure of rate of heat flow through material) through the glass edge near the wood sash can potentially be reduced from 0.34 to 0.28 (an 18 percent reduction) and the U value through the frame can be reduced from 0.44 to 0.39 (an 11 percent reduction). Using sashes made from hollow core extruded vinyl, foam filled extruded vinyl, cellular structural foam materials, plus extruded wood/plastic composites in the practice of the invention would be expected to gain similar thermal performance improvements.

As can now be appreciated, the invention is not is limited to the type of material used to make the sash members. For example, the sash members may be made of metal, however, because metal conducts heat it would act as a conductor taking heat from the home interior during winter and moving heat into the home interior during summer. If metal is used, it is preferred to provide the metal sash member with a thermal break of the types usually used in the art to reduce if not eliminate the heat loss. To reduce the chipping of the edges of the glass sheets as the peripheral edges of the sheets move into the grooves, the edges of the grooves of metal sash members may be rounded and/or the edges of sheets may be round, and/or the glass sheets may be tempered in any usual manner. Wood is preferred over metal as a material for the sash members because it is easily shaped into the desired cross sectional configuration and is a low conductor of heat. One limitation of wood, however, is that it is porous and moisture may move through the wood into the compartment between the sheets. One technique to reduce moisture moving through the wood into the compartment is to provide a seal of a moisture impervious material as described below.

Figure 10:
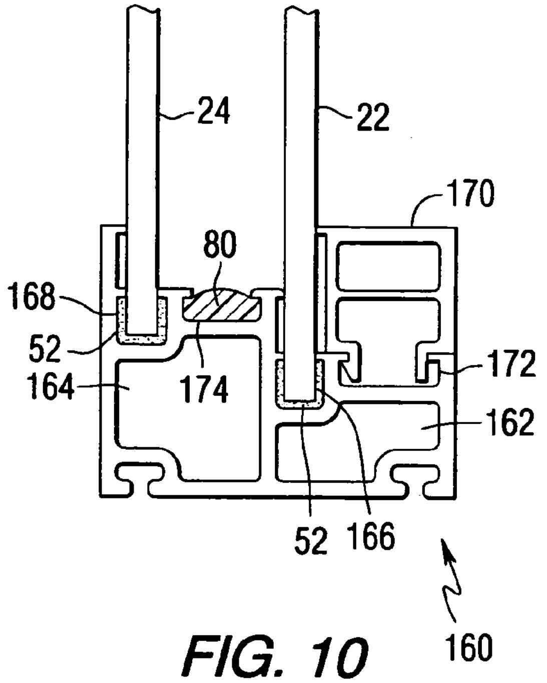
FIGS. 10-12 are views similar to views of FIG. 2 showing various cross sections of sash members that may be used in the practice of the invention.
Figure 11:
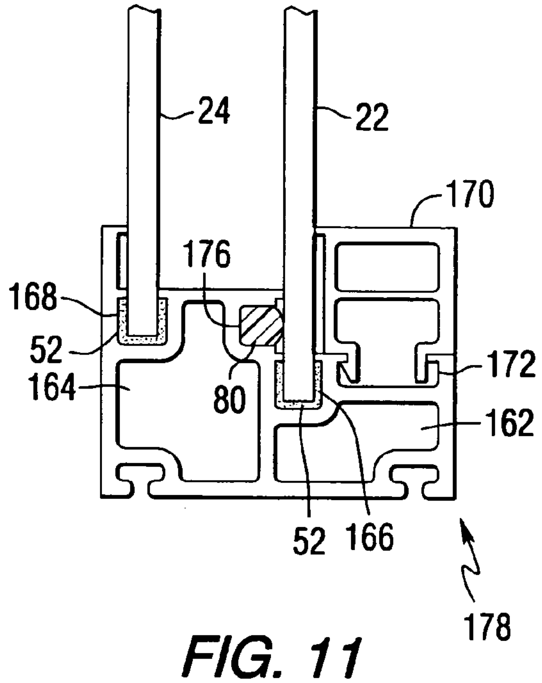

Another material that is preferred in the practice of the invention is plastic. Plastic has the advantages of having low thermally conductive and is easy to form, e.g. by pultrusion or extrusion. As can be appreciated, the invention is not limited to the cross-sectional configuration of the sash members. For example and with reference to FIGS. 10-12, there is shown cross sections of a plastic sash member that may be used in the practice of the invention. Sash section 160 shown in FIG. 10 has hollow portions 162 and 164. The hollow portion may be filled with insulating material (not shown) for reduced heat transfer. The peripheral and marginal edges of the sheets 22 and 24 are captured in grooves 166 and 168 respectively. The moisture impervious sealant adhesive 52 is provided in each of the grooves 166 and 168. A shim 170 is mounted in channel 172 in any convenient manner to balance the appearance of the window sash. The bead 80 of moisture pervious adhesive having the desiccant is mounted in channel 174 between the sheets 22 and 24 as shown in FIG. 10 or in side channel 176 formed in sash member 178 shown in FIG. 11.

Figure 12:
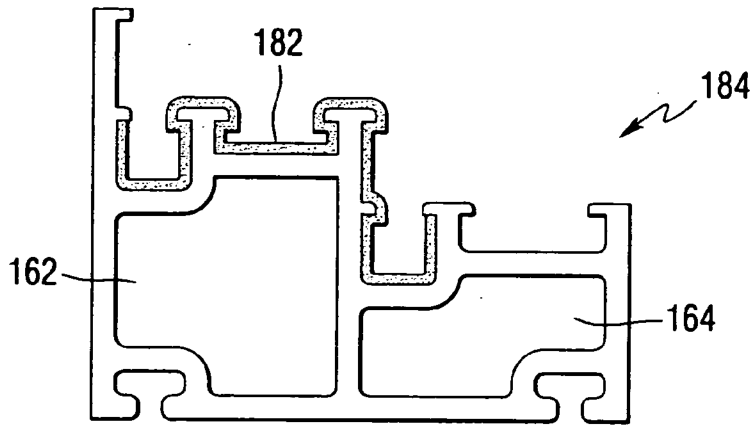

In the instance where the material of the sash member is porous, e.g. wood or plastic a barrier layer of a moisture impervious material of the type used in the art of moisture barrier layers e.g. polyvinylidenechloride (PVDC) may be flowed over surfaces of the sash member forming the compartment between the sheets and in contact with the peripheral and marginal edges of the sheets. Such a layer designated as number 182 is shown on selected surfaces of the sash member 184 as shown in FIG. 12.

As can now be appreciated, the invention is not limited to the above embodiments which are presented for purposes of describing the invention and the invention is limited by the following claims.

What is claimed is:

1. A method of making an insulating window sash comprising:

providing a plurality of sash sections, each sash section comprising a first end, an opposite second end, a first side, an opposite second side, a third side between the first and second sides, and a fourth side between the first and second sides and opposite to the third side, the second side having a first groove extending from the first end to the second end and adjacent the fourth side and a second groove extending from the first end to the second end, spaced from the first groove and adjacent the third side, the base of the first groove spaced a greater distance from the first side than the base of the second groove, a first sheet supporting surface aligned with the first groove and a second sheet supporting surface aligned with the second groove and an edge of the first sheet supporting surface spaced a greater distance from the first side than an edge of the second sheet supporting surface;

positioning the plurality of sash sections relative to one another with the first end of the plurality of sash sections facing and spaced from the second end of an adjacent one of the plurality of sash sections, the first sheet supporting surface of each one of the plurality of sash sections generally aligned with one another and the second sheet supporting surface of each one of the plurality of sash sections generally aligned with one another;

providing a first sheet and a second sheet, each of the sheets having similar peripheral configurations with the first sheet having a peripheral dimension less than the peripheral dimension of the second sheet;

supporting portions of the marginal edge of the first sheet on the first sheet supporting surface of the plurality of sash sections and portions of the marginal edge of the second sheet on the second sheet supporting surface of the plurality of sash sections, and moving the sash sections toward one another to move the first end and the second end of adjacent ones of the sash sections toward one another and portions of the supported marginal edge of the first sheet into the first groove of the sash section and portions of the supported marginal edge of the second sheet into the second groove.

2. The method of claim 1 further comprising applying a moisture impervious sealant in each of the grooves, and a moisture pervious adhesive having a desiccant on the second side of selected ones of the plurality of sash sections between the grooves of the selected ones of the plurality of sash sections.

3. The method of claim 1 wherein the window unit has a parallelepiped shape and each of the sash sections has a general "L" shape.

4. The method of claim 1 wherein the window unit has a parallelepiped shape and the plurality of sash sections comprises four linear sash members.

5. The method of claim 4 wherein during the moving of the sash members toward one another, the ends of adjacent sash members are sealed to prevent ingress of moisture into space between the sheets.

6. The method of claim 1 wherein the sheets are selected from the group of glass sheets, clear glass sheets, tinted glass sheets, coated sheets, photocatalytic coated glass sheets, glass sheets having solar control coatings and combinations thereof.

7. The method of claim 1 further comprising providing a recess in each end of the sash sections and providing a layer of a moisture impervious adhesive in the recess.

8. A method of making an insulating window sash comprising:

providing a plurality of sash members each sash member having a first side, an opposite second side, the second side having a first ledge extending away from the first side and a second ledge spaced from the first ledge and extending away from the first side, a first groove, and a second groove spaced from the first groove;

arranging the sash members relative to one another to have an end of the first ledge of each of the sash members define a first open area and an end of the second ledge of each of the sash members define a second open area greater than the first open area, wherein ends of at least two adjacent sash members are spaced from one another;

providing the first and second grooves of each sash member with a layer of a moisture impervious sealant adhesive;

positioning marginal edge portions of a first sheet on the first ledge and marginal edge portions of a second sheet on the second ledge wherein the surface area of a major surface of the second sheet is greater than the surface area of a major surface of the first sheet, and moving the sash members and the sheets relative to one another to accomplish at least one of the following: to secure any unsecured ends of adjacent sash members to one another, to move the ends of the at least two adjacent sash members toward one another to move the marginal edges of the first sheet into the first groove and the marginal edges of the second sheet into the second groove to flow the layer of moisture impervious adhesive in the first groove on marginal edge portions of the first sheet and the layer of moisture impervious adhesive in the second groove on marginal edge portions of the second sheet and combinations thereof to provide the insulating window sash.

9. The method of claim 8 wherein each of the plurality of sash members further comprises a third side between the first and second sides and an opposite fourth side, wherein the height of the fourth side measured from the first side is less than the height of the third side measured from the first side and further comprising:

mounting trim on outer surface of the second sheet.

10. The method of claim 8 wherein each of the sash members has a first end and an opposite second end and arranging the sash members, comprises:

joining the second end of a first sash member to the first end of a second sash member, and joining the second end of a third sash member to the first end of a fourth sash member, and positioning the first end of the first sash member adjacent to and spaced from the second end of the fourth sash member, and the second end of the second sash member adjacent to and spaced from the first end of the third sash member wherein the ends of the at least two adjacent sash members spaced from and in facing relationship to one another are the first end of the first sash member and the second end of the fourth sash member.

11. The method of claim 10 wherein each of the sash members are linear sash members, and each of the sash members in cross section comprises the first side, the second side and a third side between the first and second side, and a fourth side opposite to the third side, each of the grooves has a base and sidewalls with the base of the first groove spaced farther from the first side than the base of the second groove, the first ledge transitions to one of the sidewalls of the first groove and the second ledge transitions to one of the sidewalls of the second groove.

12. The method of claim 11 wherein moving the sash members and the sheets relative to one another comprises moving the ends of the first and fourth sash members, and the ends of the second and third sash members into contact with one another to move peripheral and marginal edges of the sheets into adjacent respective one of the grooves to flow the layer of adhesive around the edges of the sheets.

13. The method of claim 8 wherein each of the sash members comprises a first outer surface and a second outer surface and a peripheral surface, each of the grooves having a base and sidewalls with the base of the first groove spaced farther from the peripheral surface than the base of the second groove, a portion of the first ledge forming one of the sidewalls of the first groove and a portion of the second ledge forming one of the sidewalls of the second groove, and the sash members further comprising a third groove between and spaced from the first and second grooves and having a base and sidewalls and a portion of a third ledge forming one of the sidewalls of the third groove and further comprising the step of positioning a third sheet on the third ledge.

14. The method of claim 13 wherein the base of the third groove is spaced a distance from the peripheral surface less than the distance of the first groove and greater than the distance of the second groove.

15. The method of claim 14 wherein the step of moving the sash members and the sheets relative to one another comprises the step of moving the ends of the first and fourth sash members and the ends of the second and third sash members into contact with one another to move peripheral and marginal edges of the sheets into adjacent respective grooves of the sash members to flow adhesive around the edges of the sheets.

16. The method of claim 8 wherein the sheets are selected from the group of glass sheets, tinted sheets, coated sheets, photocatalytic coated glass sheets, glass sheets having solar control coatings and combinations thereof.

17. The method of claim 8 further comprising providing a recess in each end of the sash members, and applying a layer of a moisture impervious adhesive in the recess.

18. The method of claim 17 further comprising providing a moisture pervious adhesive having a desiccant on surface of second side of selected ones of the sash members between the grooves.

19. A method of making an insulating window sash, comprising:

providing four sash members, each sash member comprising a first end, an opposite second end, a first side, an opposite second side, a third side between the first and second side, and a fourth side opposite to the third side; a first ledge on the second side and adjacent the fourth side and a second ledge on the second side spaced from the first ledge and adjacent the third side, each of the first and second ledges extending away from the first side; a first groove in the second side between the first and second ledges and extending from the first end to the second end, and a second groove in the second side between the second ledge and the third side and extending from the first end to the second end, and two glass sheets each having similar peripheral configurations with the first sheet having a peripheral dimension greater than a peripheral dimension of the second sheet;

assembling the four sash members and the two glass sheets to have the second end of the first sash member spaced from the first end of the second sash member, the second end of the second sash member spaced from the first end of the third sash member, the second end of the third sash member spaced from the first end of the fourth sash member and the second end of the fourth sash member spaced from the first end of the first sash member; marginal edges of the first sheet supported on the first ledge of the sash members adjacent the first groove, and the marginal edges of the second sheet supported on the second ledge of the second sash members adjacent the second groove, and moving selected ones of the sash members to move the marginal edges of the first sheet into the first groove of one or more sash members and the marginal edges of the second sheet into the second groove of one or more sash members.

* * * * *